Feb. 17, 1970  J. S. CLARKE ET AL  3,495,732
INSULATED CRYOGENIC TANK
Filed July 28, 1967  12 Sheets-Sheet 2

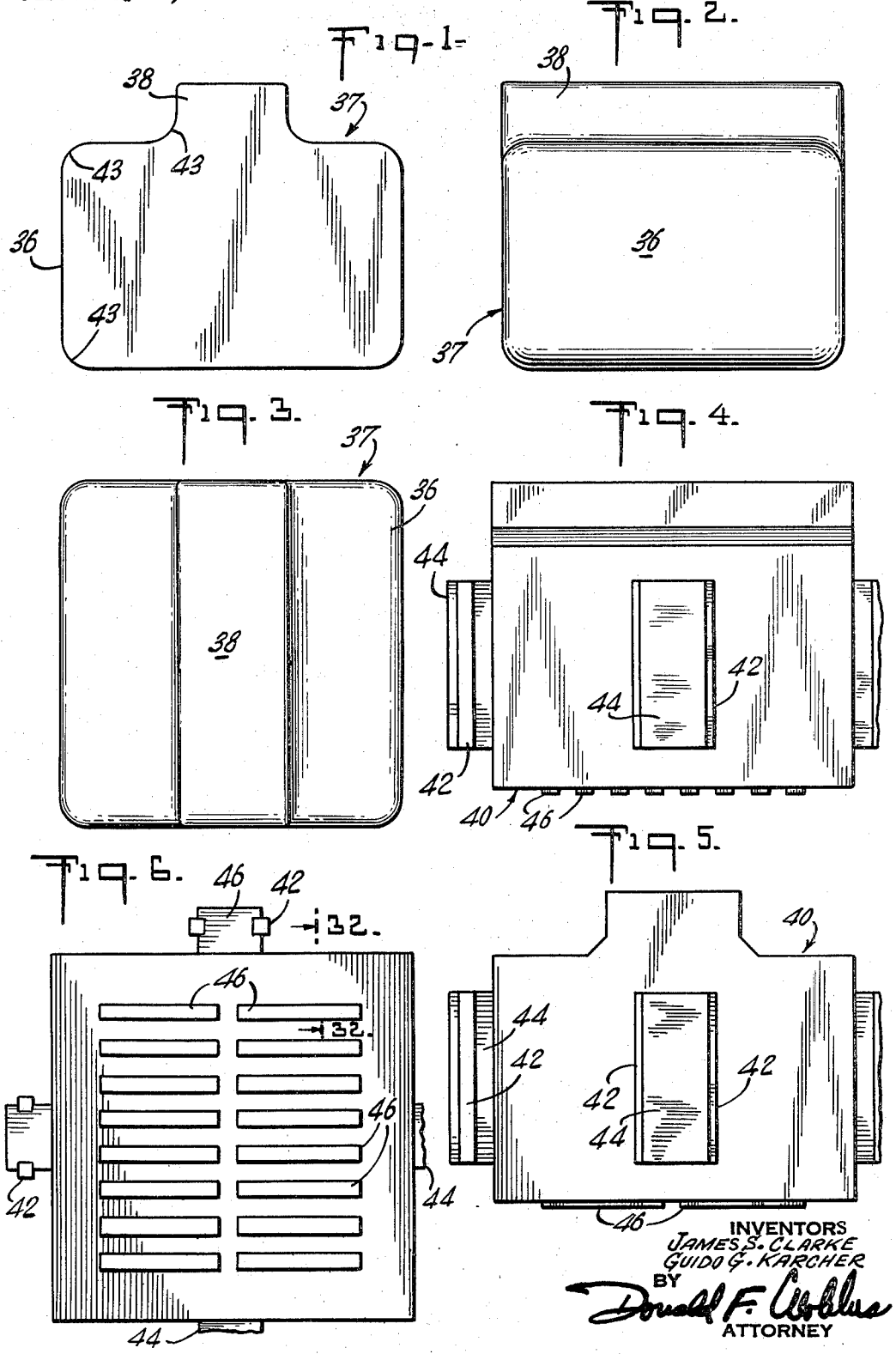

INVENTORS
JAMES S. CLARKE
GUIDO G. KARCHER
BY
ATTORNEY

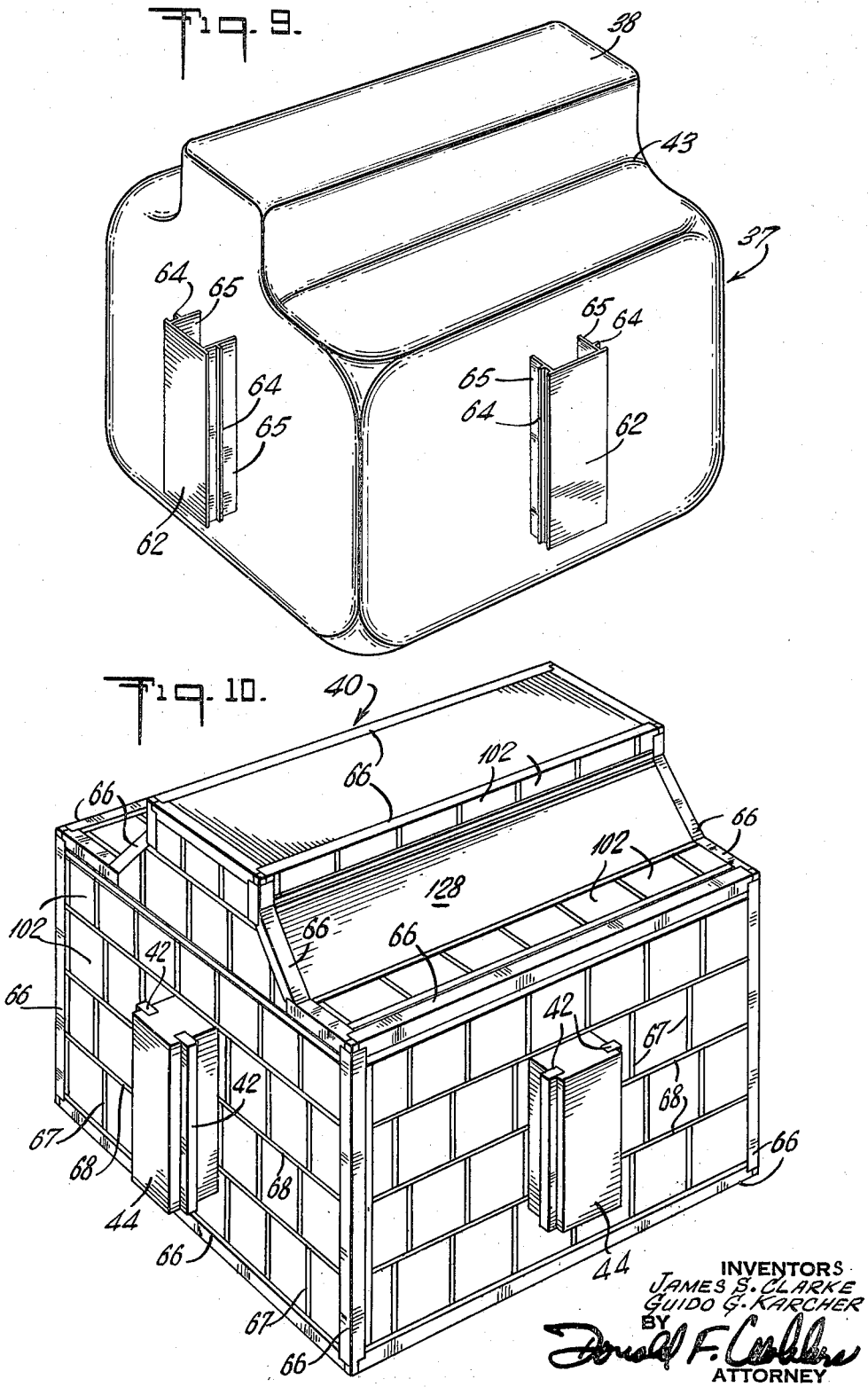

Feb. 17, 1970  J. S. CLARKE ET AL  3,495,732
INSULATED CRYOGENIC TANK
Filed July 28, 1967  12 Sheets-Sheet 4
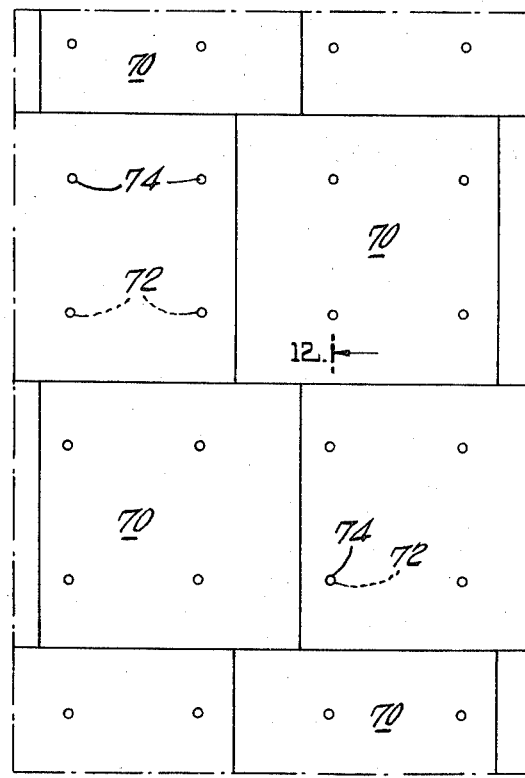
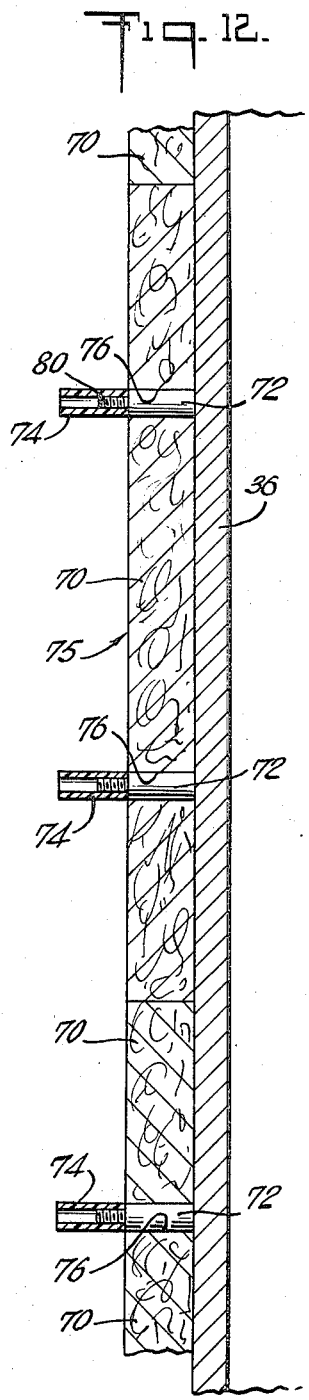
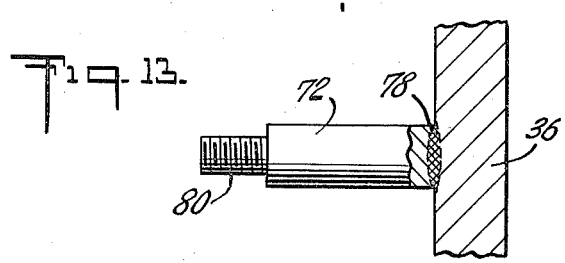
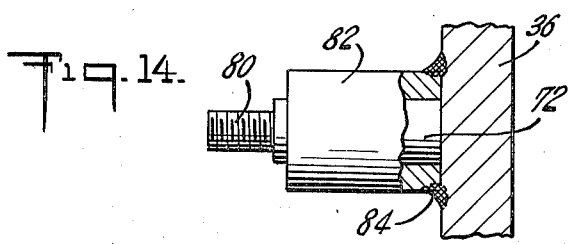
INVENTORS
JAMES S. CLARKE
GUIDO G. KARCHER
BY
ATTORNEY

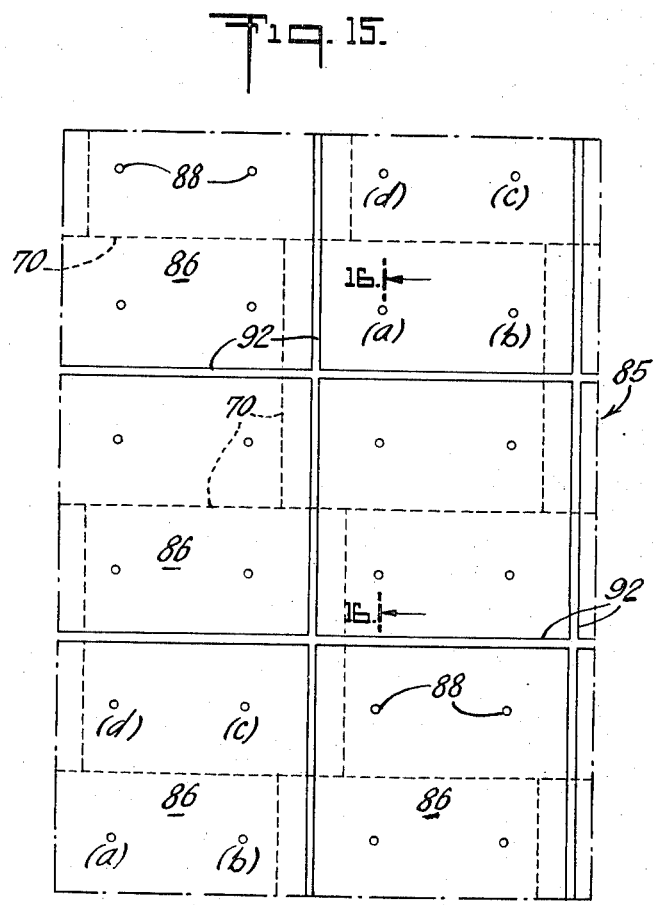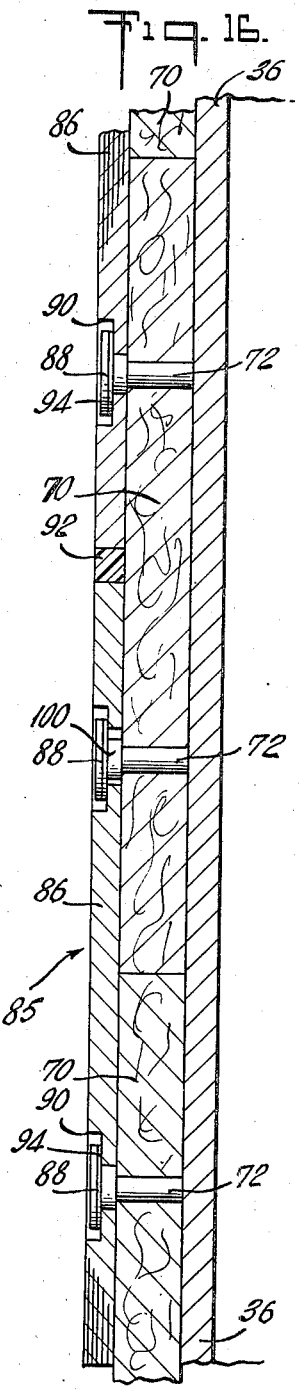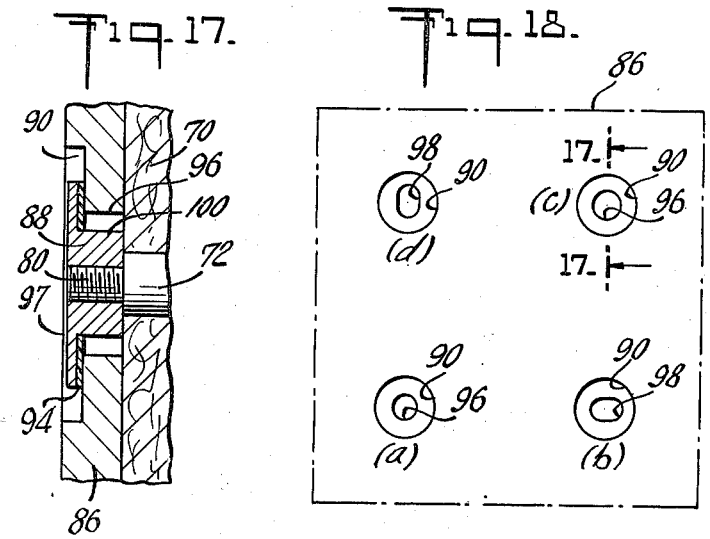

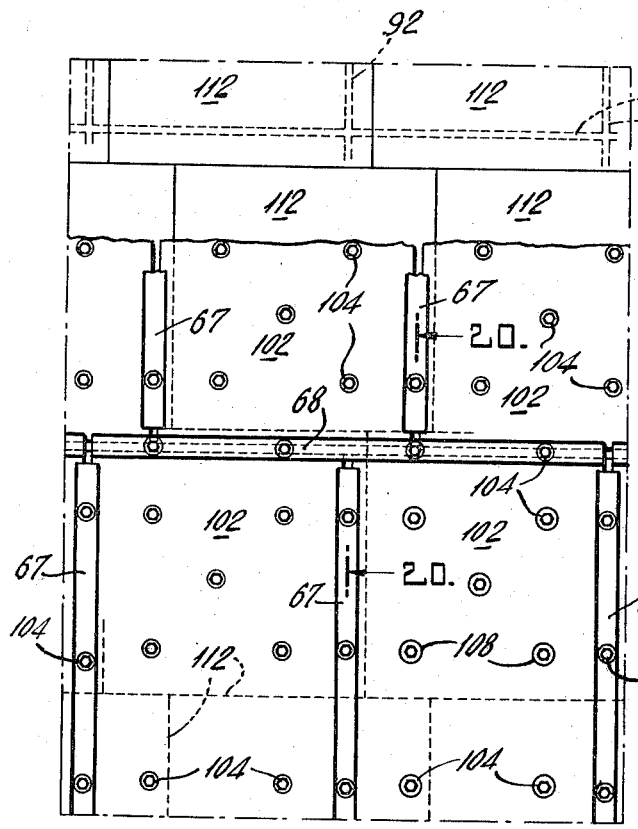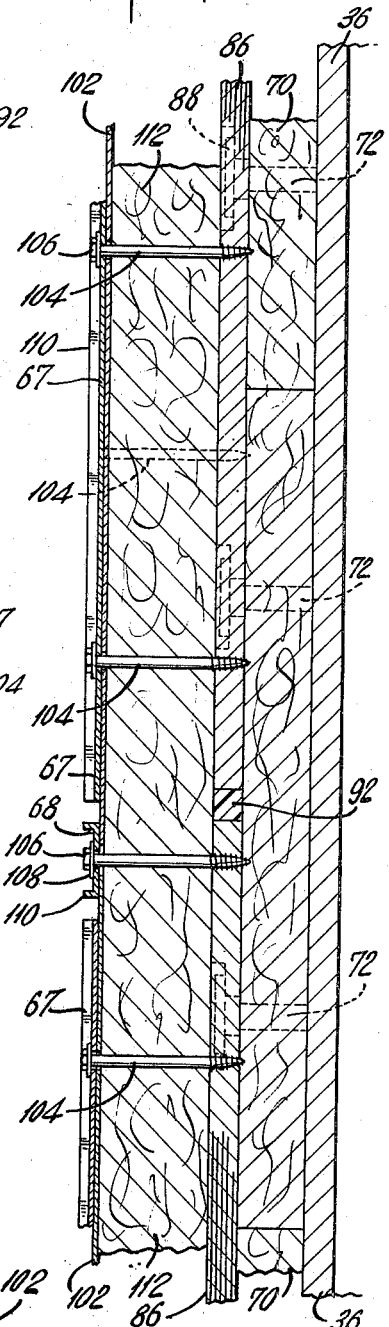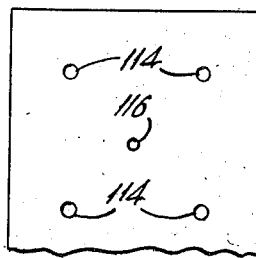

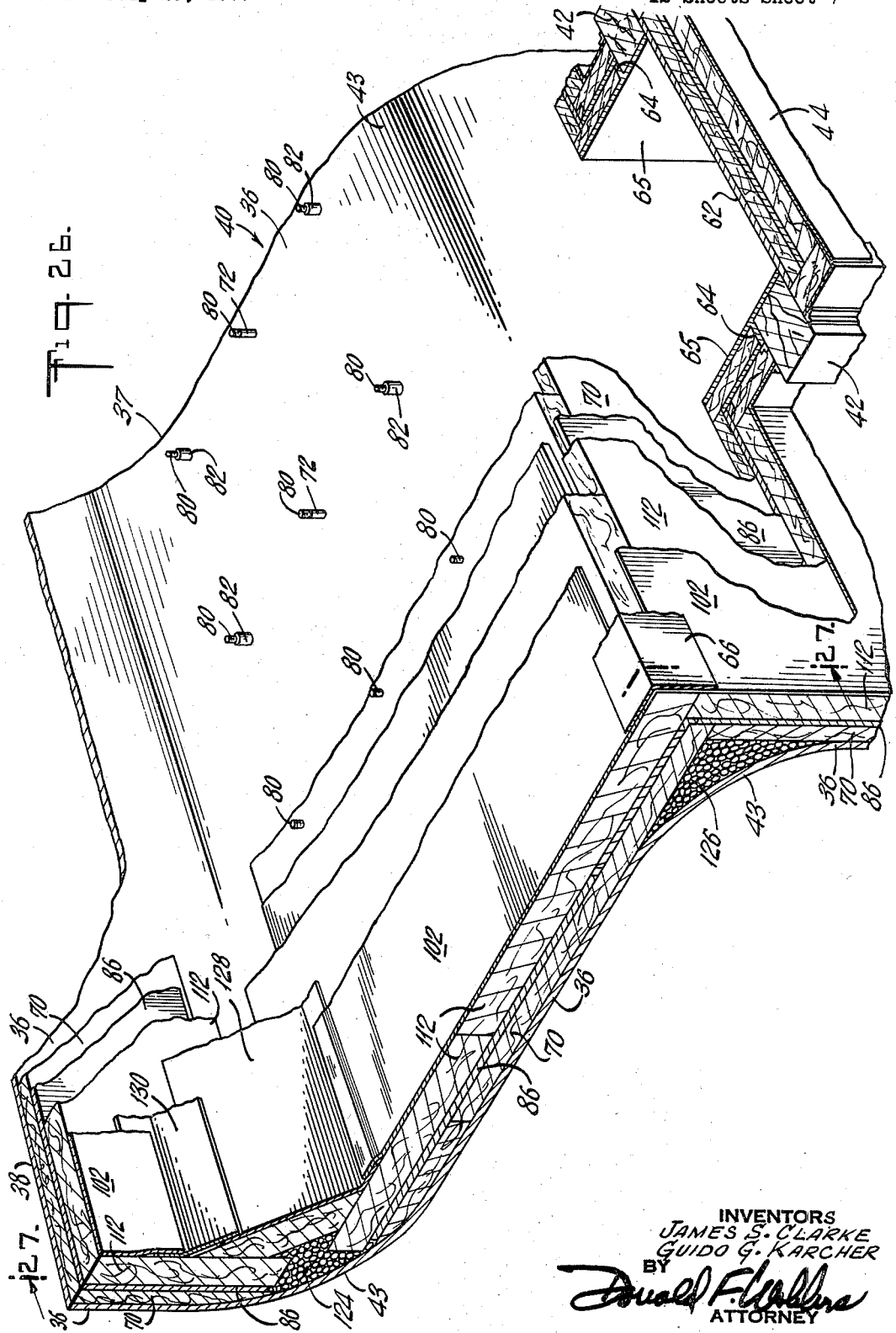

Feb. 17, 1970  J. S. CLARKE ET AL  3,495,732
INSULATED CRYOGENIC TANK
Filed July 28, 1967  12 Sheets-Sheet 8

INVENTORS
JAMES S. CLARKE
GUIDO G. KARCHER
BY
ATTORNEY

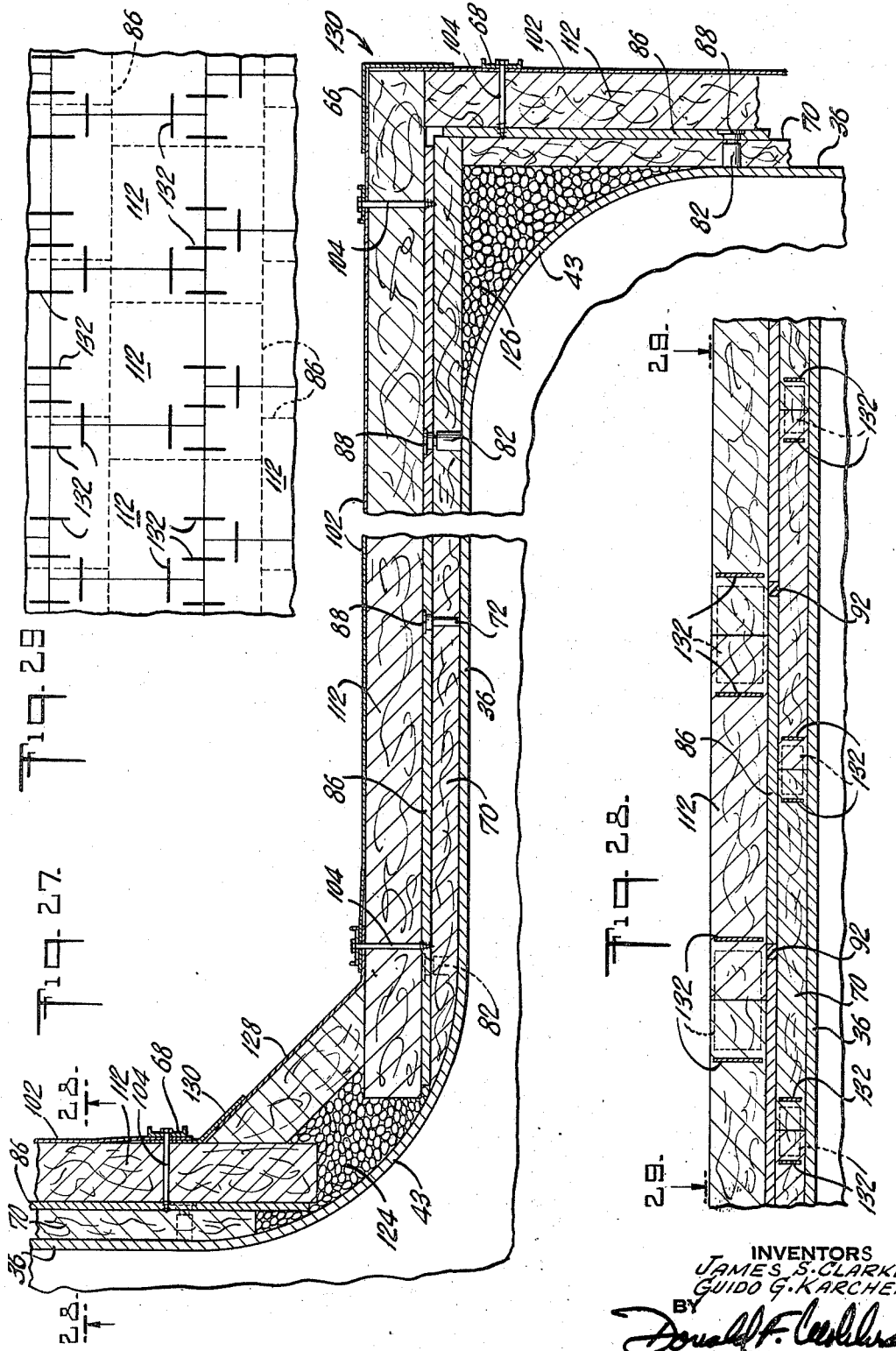

Feb. 17, 1970  J. S. CLARKE ET AL  3,495,732
INSULATED CRYOGENIC TANK
Filed July 28, 1967  12 Sheets-Sheet 10
Fig. 30.
Fig. 31.
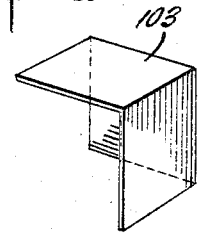
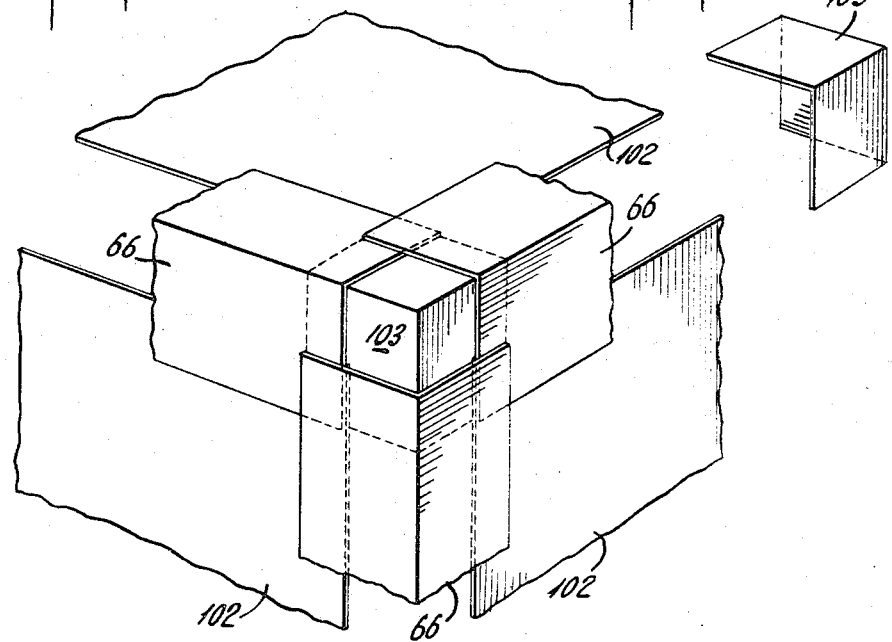
Fig. 32.
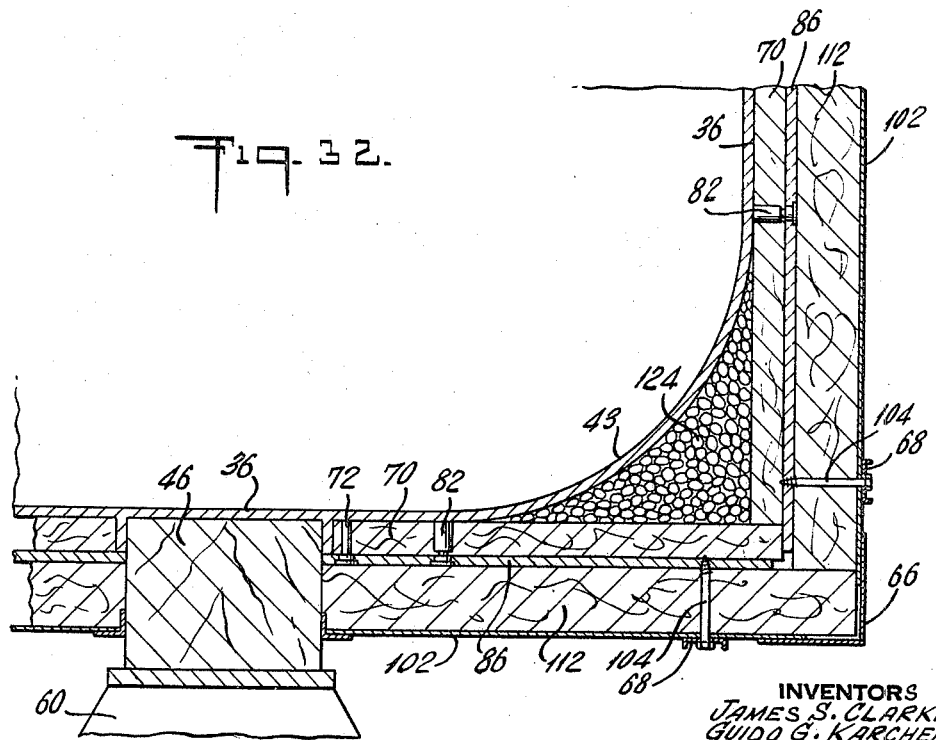
INVENTORS
JAMES S. CLARKE
GUIDO G. KARCHER
BY
Donald F. Walters
ATTORNEY

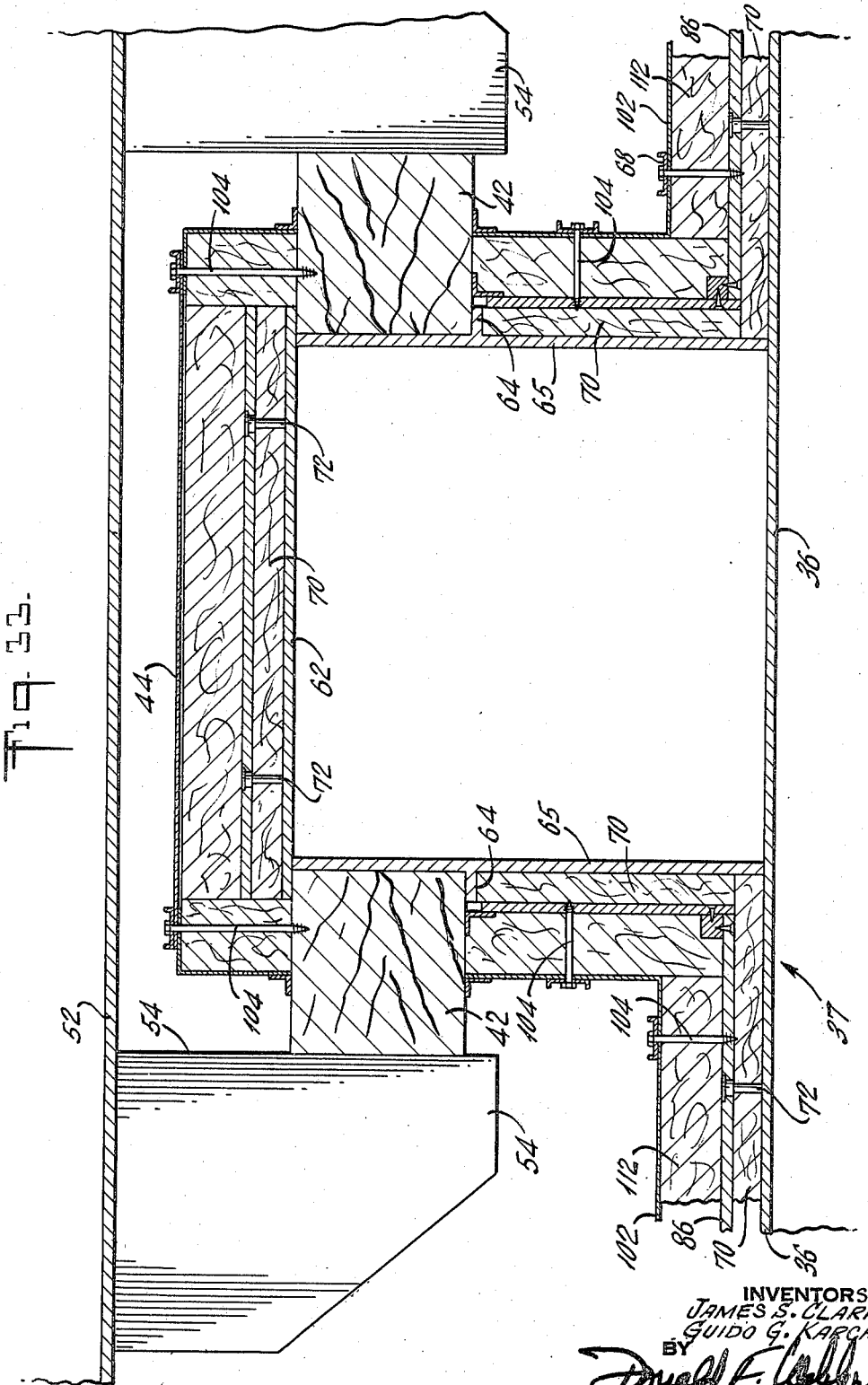

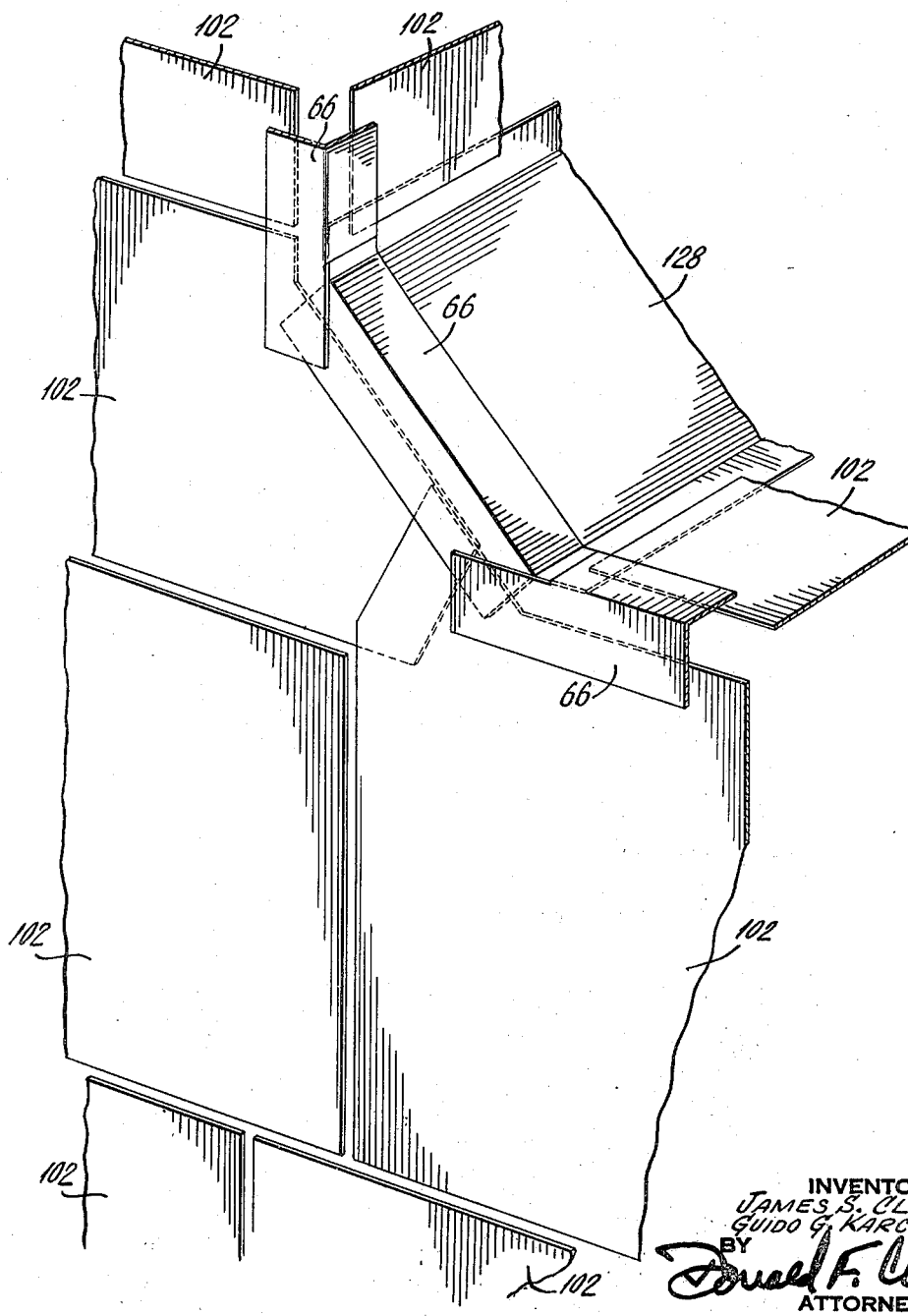

United States Patent Office 3,495,732
Patented Feb. 17, 1970

3,495,732
INSULATED CRYOGENIC TANK
James S. Clarke, Cranford, N.J., and Guido G. Karcher, Oxshott, Surrey, England, assignors to Esso Research and Engineering Company, a corporation of Delaware
Filed July 28, 1967, Ser. No. 656,837
Int. Cl. B65d 25/18
U.S. Cl. 220—10                        10 Claims

ABSTRACT OF THE DISCLOSURE

The instant disclosure is directed to a multilayer insulation system for cladding cryogenic tankage and the like. A preferred embodiment comprises a first and second layer of insulating panels with a structural support layer interposed therebetween. The function of this intermediate support layer is twofold, first to maintain the first layer of insulating panels in position against the walls of the structure to be insulated and second to provide a structural base to which the second layer of insulating panels may be secured.

Background of the invention

The present invention relates in general to insulated containers adapted to transport cryogenic cargoes, such as liquefied natural gas at atmospheric pressures. More particularly, the invention relates to insulated containers for use in cargo ships.

It has been established that the transportation of gases, such as natural gas and the like, to remote locations may best and most efficiently be accomplished by reducing the volume of the gas through its conversion into the liquid state. Such conversion enables the volume requirements for storage to be greatly reduced (approximately 600 fold for a given quantity of methane gas, for example) and as may readily be appreciated, enables the most efficient transfer of the gas to a remote area.

In order that the liquefied gas be transported in a practical and economic manner and in relatively large volumes, it becomes necessary to store the liquefied gas at pressures close to atmospheric. This is dictated by the fact that large containers built to withstand super-atmospheric pressures would be highly impractical to build from an economic as well as physical standpoint. While these considerations dictate the transportation of liquefied gases at atmospheric pressure, it is to be realized that under these conditions the liquefied cargoes will have extremely low vaporization points ranging from about −435° F. for liquefied hydrogen, for example, to −28° F. for liquid ammonia. These unusually low temperatures present problems in the design and construction of insulated cargo containers. Specifically, the containers must be properly insulated to protect heat losses which would lead to excessive volatization and boil off of the stored liquefied gas. Both the containers and their associated insulated systems must also be of sufficient strength to withstand the internal stresses that may be induced therein by large temperature gradients through the walls of the container. Furthermore, the cargo container and its insulation must also be able to withstand the dynamic forces imposed upon them by the motion of the ship. In addition, the ship must be safeguarded against uncontrolled flow of low temperature liquid into contact with parts of the ship's structure which could be damaged thereby. Accordingly, for the purposes of increased reliability and safety and in accordance with accepted regulatory codes, it has been a well-established practice in the prior art to provide a primary and secondary liquid-tight barrier system for the storage and transportation of liquefied natural gases at cryogenic temperatures, each of these barriers being independently capable of withstanding thermal and hydrostatic stresses imposed by the liquefied cargoes.

The present invention locates the insulation material exterior of the outer wall of the double wall container and hence permits each wall to operate at substantially the same temperature thereby eliminating the need to provide means for permitting dimensional changes therebetween.

Summary of the invention

In accordance with the principles of the present invention, an improved insulation system is provided for use on a double wall cryogenic tank of the type described in U.S. 3,319,431. It is to be appreciated that while the improved insulation system of the instant disclosure is particularly suited to use with such a double wall container, it is by no means limited to such use. It may be employed to equal advantage on single wall containers. When the insulation system to be herein subsequently discussed is used with a double wall tank, advantages over the prior art are readily achieved. These advantages include the fact that the insulation need not be impervious to the cargo, nor does it have to withstand the hydrostatic pressures thereof, since the barrier requirements are fulfilled by the double wall container itself. Therefore, the insulation system of the instant invention may be constructed without resorting to expansion joints. This construction may be realized at a relatively low cost and in a simplified manner in comparison, for example, with those intricate insulating systems of the prior art which also serve as liquid and gas tight barriers. Such intricate systems invariably employ special materials and sophisticated, integral expansion joints, or their equivalents, to maintain the integrity and impermeability, i.e., the barrier status, of the insulation.

Accordingly, it is an important object of the present invention to provide an improved and lower cost insulation system for a cryogenic container.

Another object of the invention is to provide an insulation system which is readily adaptable to shipyard fabrication and installation by relatively unskilled labor.

In accordance with the preferred embodiment of the invention, an insulation system is provided which comprises in part a double layer of foamed plastic insulation panels. These first and second layers of foam are separated by a structural layer of thermally non-conductive material such as plywood, whose function is twofold, first to maintain the first foam layer in position against the walls of a tank and second to provide a structural base to which the second foam layer may be attached. By providing this intermediate support layer, the fastening means used to secure the second layer of foam insulation do not have to be attached to the cold wall of the tank. This, of course, minimizes heat leakage through the fastening means. Furthermore, by using a multilayer system it is possible by the staggering of joints to avoid a situation where a straight through path would exist from the warm side of the system to the cold side. This too minimizes heat leaks. An outer metal sheathing is provided on the outside of the second foamed plastic layer to protect the same.

For a more complete understanding of the present invention and its advantages, reference should be made to the following detailed description taken in conjunction with the accompanying drawings in which:

FIGURE 1 is a diagrammatic end view of the cryogenic tank itself.

FIGURE 2 is a side elevational view of the tank shown in FIGURE 1.

FIGURE 3 is a plan view of the tank shown in FIGURE 1.

FIGURE 4 is a diagrammatic side elevation of the tank with insulation and also shows the key members on the tank.

FIGURE 5 presents an end view of FIGURE 4.

FIGURE 6 is a bottom view of FIGURE 4.

Figure 7:
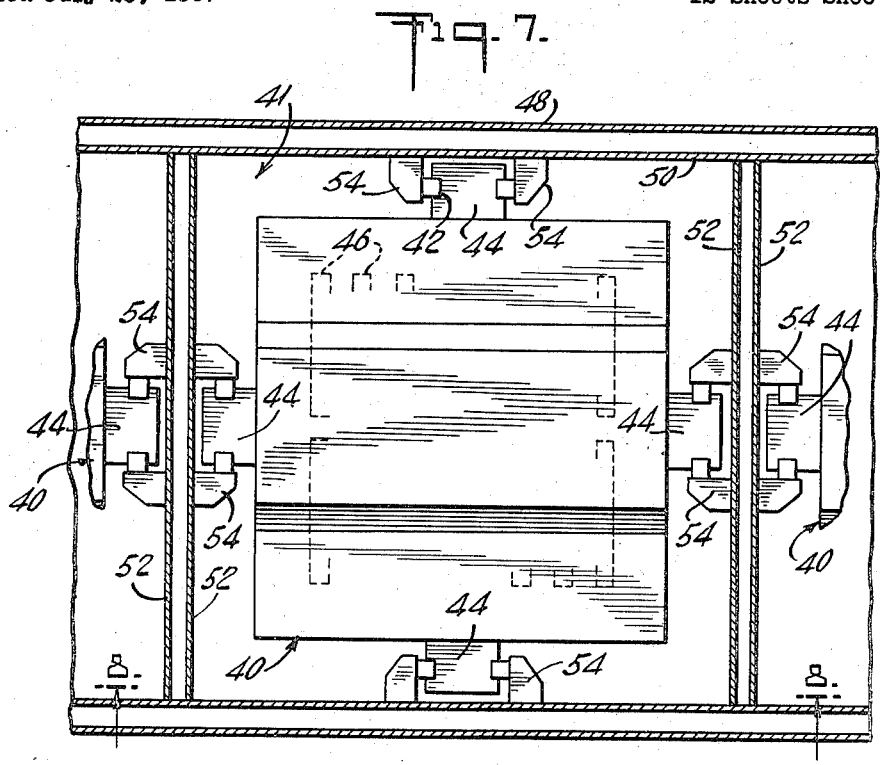

FIGURE 7 is a diagrammatic sectional plan view showing the installation of the tank within the hull of a ship.

Figure 8:
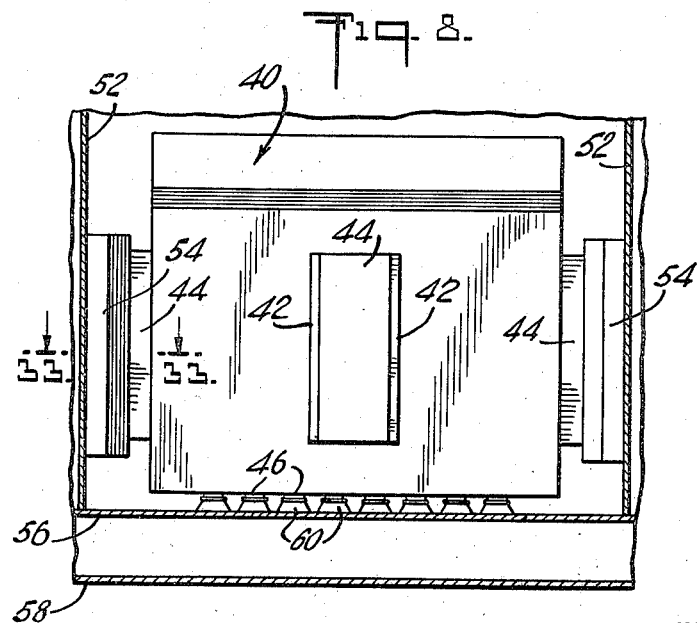

FIGURE 8 is a sectional view taken along the line 8—8 of FIGURE 7.

FIGURE 9 is a prespective view of the tank itself showing the metal keys welded thereto.

FIGURE 10 is a prespective view of the tank with its insulation completely installed.

FIGURE 11 is a side elevational view depicting the first step of the fabrication and installation of the insulation on the tank.

FIGURE 12 is a sectional view taken along the line 12—12 of FIGURE 11.

FIGURE 13 is a detail of the studs shown in FIGURE 12.

FIGURE 14 is a detail of the studs used at the corners of the tank.

FIGURE 15 is a side elevational view depicting the second step of the fabrication and installation of the insulation on the tank.

FIGURE 16 is a sectional view taken along the line 16—16 of FIGURE 15.

FIGURE 17 is a detail of the fastening nuts shown in FIGURE 16.

FIGURE 18 is a detail of the relationship of the holes shown in the plywood sheets of FIGURE 15.

FIGURE 19 is a side elevational view depicting the third step in the fabrication and installation of the insulation on the tank.

FIGURE 20 is a sectional view taken along the line 20—20 of FIGURE 19.

FIGURE 21 is a detail of the stud screws shown in FIGURE 20.

FIGURE 22 shows a detail of the holes in the metal sheathing shown in FIGURE 19.

Figure 23:
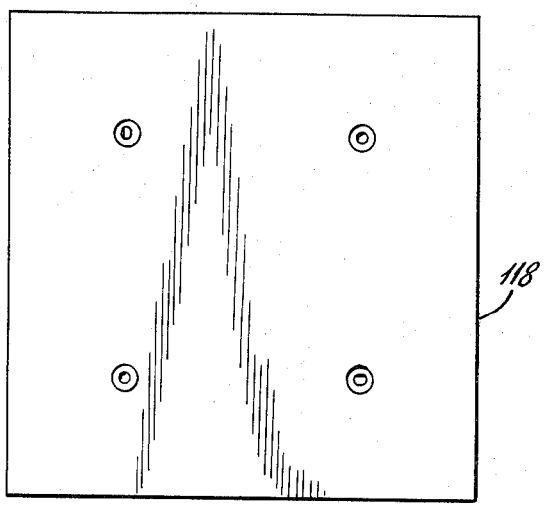

FIGURE 23 shows in plan the preferred size of the individual plywood sheets shown in FIGURE 20.

Figure 24A:
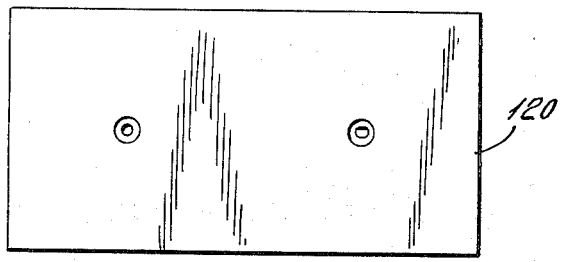
Figure 24B:
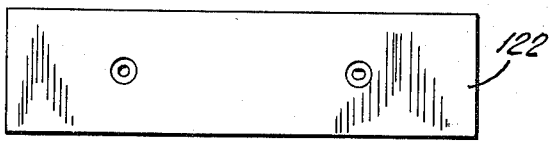

FIGURES 24a and 24b show in plan two alternative sizes for individual ones of said plywood sheets.

Figure 25:
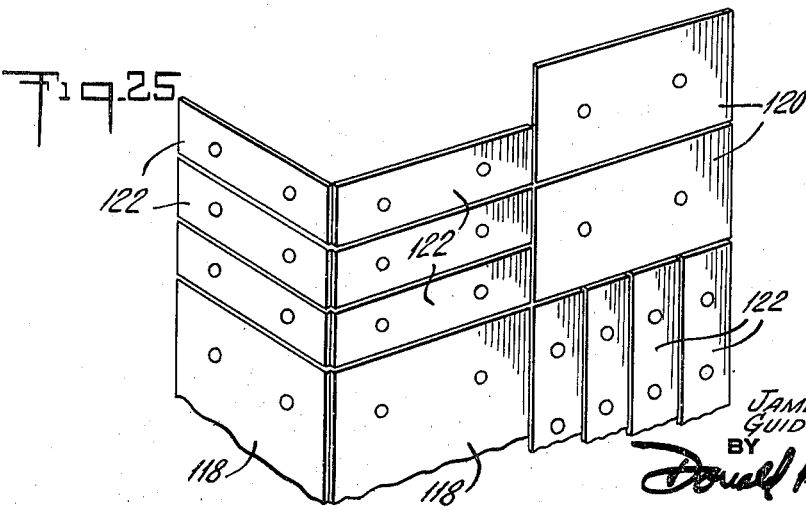

FIGURE 25 is a partial diagrammatic prespective view showing how the various sizes of the individual plywood sheets shown in FIGURES 23–24 may be installed.

FIGURE 26 is a prespective view (with parts broken away) showing installation of the insulation on both inside and outside corners and on one of the keys of the tank.

FIGURE 27 is a sectional view taken along the line 27—27 of FIGURE 26.

FIGURE 28 is a cross-sectional view taken along the line 28—28 of FIGURE 27.

FIGURE 29 is a diagrammatic plan view looking in the direction of the arrows 29 of FIGURE 28.

FIGURE 30 is a partial diagrammatic prespective view showing the metal sheathing at a three-way corner of the tank.

FIGURE 31 is a detail of the corner cap shown in FIGURE 30.

FIGURE 32 is a sectional view taken along the line 32—32 of FIGURE 6 and shows a portion of the bottom of the tank.

FIGURE 33 is a plan sectional view of the key and keyway taken along the line 33—33 of FIGURE 8.

FIGURE 34 is a partial diagrammatic perspective view showing the installation of the metal sheathing on an inside corner of the tank.

Referring to the figures in detail, FIGURES 1–3 show respectively an end, side and top view of a cargo tank 37, which is to be covered with the insulation system of the instant invention.

Tank 37 is of general rectilinear prismatic shape and is provided with a trunk section indicated 38. The corners 43 of the main portion of the tank, as well as those between the main portion of the tank and its trunk section, i.e. corners 43, are curved so as to avoid any stress buildup in these areas.

FIGURES 4 through 6 respectively show a side view, end view and bottom view of tank 37, clad with the insulation system of the instant invention, indicated generally at 40 in FIGURE 4. Tank 37 is also provided with keys (not shown in FIGURES 1–3) which will be herein subsequently discussed. These keys are shown, covered with insulation, at 44 in FIGURES 4 through 6. Key bearing blocks 42, whose function will be further described, are installed in the keys. Referring to FIGURE 6, the insulated tank rests on bearing blocks 46, which may preferably be fabricated from balso wood or the like and whose function will also be discussed subsequent hereto.

FIGURE 7 presents a diagrammatic sectional plan view showing the installation of the insulated tank 40 within a ship's cargo hold indicated generally at 41. The ship may be of double-hulled construction, having an outer hull 48 and an inner hull 50. Preferably, double-walled transverse bulk heads 52 are disposed between the sides of the inner hull 50. Each of the interior walls defining hold 41 is provided with brackets 54, which define a keyway to engage the keys 44 and their associated bearing blocks 42 of tank 40. FIGURE 8, taken along the line 8—8 of FIGURE 7, shows the supporting means for the bottom of tank 40. These supporting means include a plurality of bearing blocks 46 which in turn are supported by a plurality of support rails 60 which are affixed to the bottom 56 of the hold 41. Supporting rails 60 may preferably be made from a metal which retains its physical properties at cryogenic temperatures, for example, 9% nickel steel.

FIGURE 9 shows a perspective schematic view of tank 37 before the insulation system of the instant invention has been applied thereto. As may be clearly seen, each of the keys 62 defines a pair of grooves 64 in their two sides 65. Grooves 64 are adapted to receive the bearing blocks 42 shown in FIGURE 4. A diagrammatic perspective view showing tank 37 as it would appear when covered with the insulation system of the present invention is shown in FIGURE 10. The corners of the insulation are protected by a plurality of metal sheathing angles indicated at 66. These will be discussed in further detail hereinafter.

A plurality of batten strips indicated generally at 67 are also shown (the function of these strips will be discussed in conjunction with FIGURE 21).

Reference will now be had to FIGURES 11 through 34 as teaching a preferred method of constructing and installing the improved insulation system of the instant invention. Referring first to FIGURE 12, reference numeral 36 identifies the wall of the tank or structure to be insulated. In the case where use is made of a double walled tank, wall 36 would represent the outer wall of such a tank. Affixed to wall 36 are a plurality of mounting means 72. These mounting means are preferably aluminum studs having a base portion 76 and a threaded portion 80. Studs 72 may be welded to wall 36 as shown at 78 in FIGURE 13. In a preferred embodiment these studs have a nominal diameter of ⅝ of an inch and are disposed on the wall 36 with a 2′ x 2′ nominal spacing. The threaded portion 80 of studs 72 may be provided with a removable impaling head 74 whose function will be discussed below. The first insulation layer indicated generally at 75 is composed of a plurality of individual insulation panels 70. Panels 70 may be fabricated from any suitable insulation material but foamed plastics of the type including polystyrene, polyurethane and polyvinyl chloride are particularly suitable. In the preferred embodiment, polyvinyl chloride is used to advantage. The inner insulating panels 70 are 4′ x 4′ and two inches thick. These panels are installed in place by being impaled over the impaling heads 74. The first panel is properly positioned and subsequent panels are then installed tightly against the edges of the panel or panels that are already in place. Impaling heads 74 are removed from the threaded portion 80 of the studs 72 as each panel is in place. It has been found that impaling head 74 may be constructed in the form of a thin walled tube with the periphery at one end sharpened. Such a tube will core out a clean hole in the insulation panel without spoiling the surface on breakthrough and without necessitating the rotation of the cutting tube during the piercing operation.

A series of inner insulation panels 70 shown in position over the studs 72 is depicted in the schematic drawing in FIGURE 11.

FIGURE 14 illustrates the type of mounting means that will be used to install the insulation at the corners of the tank. Due to higher stress conditions which invariably result at the intersection between sides and bottoms, sides and tops, etc., of tanks, the studs to be used at these locations should be stronger than the studs used at other locations. In a preferred embodiment additional strength is achieved by utilizing an aluminum collar 82 which is welded about its periphery to the tank 36 as indicated by reference numeral 84 in FIGURE 14.

FIGURES 15 through 18 and 23 through 25 illustrate the second basic phase in the fabrication of the instant insulation system. Following the installation of foam panels 70, a structural support layer indicated generally at 85 in FIGURE 16 is installed. In the preferred embodiment this layer is comprised of a plurality of individual plywood panels ⅝" thick and 3'11½" square. As shown in FIGURE 15, these panels are installed such that a nominal gap of one half inch exists between adjacent panels. The plywood panels serve as structural members and for this reason each panel is to be located symmetrically with respect to the four studs which support it. While the plywood panels do not primarily serve as insulation, the spaces between panels, nevertheless, are staggered with respect to the junctions between the blocks of inner insulation to minimize heat leaks. The half-inch gaps between the panels are filled with compressed elastic foam gasketing material (92 in FIGURE 16) to the same end.

FIGURE 18 details the relationship of the predrilled holes which exist in each of the plywood panels 86. Holes 96 at (a) and (c) in FIGURE 18 are drilled such that there exists a clearance of plus or minus of one-eighth inch with respect to the diameter of studs 72. Holes 98 indicated at (b) and (d) in FIGURE 18 are slotted. This configuration of holes allows each pannel to be symmetrically located with respect to the four studs which support it. Each of the holes is surrounded by a counter sunk hole 90 which is adapted to receive the threaded nut 88 shown in detail in FIGURE 17. A Teflon washer 94 is interposed bketween the enlarged head 97 of the nut 88 and that portion of the plywood on which head 97 bears. The nuts 88 are torqued to a predetermined level. After this tightening operation, the head of stud 72 may be peened or spot welded so that nut 88 will not loosen in service. As an important aspect of the instant invention, it is to be noted that the nuts 88 are not tightened to the extent that all slippage between the faces of the insulaion panels 70 and the plywood panels 86 would be eliminated. In this regard it may be seen that the holes 96 and slots 98 of the plywood panels and their associated countersunk holes 90 allow limited displacement of the plywood panels with respect to the studs and hence with respect to the individual insulation panels 70. This allows the structural layer composed of the individual plywood panels when subjected to thermal contraction to be "free-floating" within certain defined limits.

While it has been indicated that a preferred size for the individual plywood panels may be 3'11½" square, smaller modules, as illustrated in FIGURES 24(a) and and 24(b), one-half and one-quarter the size of the preferred panels may also be employed to advantage in certain locations on the tank. FIGURE 25 illustrates schematically how "quarter panels" indicated by reference numeral 122, and "half-panels" 120 may be combined with full panels 118 to cover a corner portion of the tank.

The third major step in the fabrication of the insulation system of the instant invention is detailed in FIGURES 19 through 22. Referring to FIGURE 20, after plywood sheating 86 has been installed, the next step in the construction of the insulation consists of securing a second layer of insulation panels to the plywood. This layer is composed of panels 112 which are nominally 4' x 4' and which are in the preferred embodiment four inches thick. The individual panels here again are installed tightly one against another. This layer of insulation is covered by a metal sheating indicated at 102. This sheathing is made up of plates which are nominally 3'11" square and the one ince gaps, 114 (in FIGURE 21) therebetween are covered by batten strips 67 and 68 which are approximately three inches wide and one-eighth inch thick. The long edges of the battens 110 are turned up approximately one-half inch to prevent buckling under compressive frictional loading during cool down and to resist dynamic forces when the ship is at sea. The outer layer of the insulation and the metal sheathing are secured to the plywood structural layer 86 by means of stud screws 104. Screws 104 are provided with hexheads and have an approximately three-quarter inch long wood screw thread section at their ends 113. Hence, the screw tips extend about one-eighth inch beyond the inner surface of the plywood for increased bite. Five of these stud screws are used to secure each sheathing plate and the four inch thick insulation behind it. As may be seen in FIGURE 22, one of these stud screws goes through a hole 116 at the center of the sheathing plate. This center hole has approximately the same nominal diameter as the stud screw and hence a snug fit is maintained between the stud screw and the plate at this point. Holes 114 are approximately one-quarter inch in diameter oversized and are located halfway between hole 116 and the respective corner of sheet 102. Each of the five stud screws used to secure sheet 102 is provided with a washer under its hexhead. Thus the center stud screw fixes the position of the sheet 102 while the four other stud screws allow for small amounts of thermal movement that may take place in service. The holes through the insulation and into the plywood may advantageously be drilled in the field at the time of installation and hence do not involve a lining up with predrilled holes in the insulation or the plywood. This, of course, minimizes installation difficulties and allows for tight positioning of the outer insulating panels against one another. It is also to be pointed out that since stud screws 104 are not affixed to cold tank wall 36, but to the relatively warmer plywood layer 86, they do not serve as paths of major heat leaks.

In the preferred embodiment each of the longitudinal batten strips 67 are 7'11½" long, which allows for a ½" clearance between the ends of adjacent longitudinal battens. They are secured by four stud screws, one of which passes through a hole having substantially the same diameter as the diameter of the stud screw and this fixes that point of the batten with respect to the plywood sheathing. The other holes in the batten are elongated (not shown) to permit some relative movement with temperature changes and other slight movements which will occur in service. The transverse battens 68 are fixed in a similar manner, thus they too are permitted to undergo certain predetermined axial movements. As with the installation of the metal sheathing layer 102, all of the holes in the second insulation layer and the plywood which accommodate the stud screws which hold the battens in place are drilled in the field and, therefore, here also no matching up of predrilled holes is necessary. As most clearly shown in FIGURE 19, which is a breakaway plan view, all junctions between the various panels comprising the various layers which in turn make up the composite insulation system are staggered so as to eliminate straight-through penetration at any point.

A unique feature of the instant invention, which would be obvious to one skilled in the art at this point, is the fact that the insulation system discussed may be dismantled and reassembled without destroying any of the components. Such a feature would have particular significance if regulatory bodies should decide to require periodic inspection of the outer wall of the cargo tank.

For a general, overall view of the various components making up the instant insulation system, reference should be made to FIGURE 26. This figure shows construction details on both type exterior corners, designated 43. This view also shows the typical construction used at one of the keyways. A significant detail of the installation construction at an exterior corner such as 43 is that the plywood panels 86 extend over the rounded corner of the tank to provide for attachment and support of the insulation and sheathing. This permits the use of rectilinear insulation panels and thus eliminates any need for molded insulation to fit the contour of the tank. The void 126 between the curved corner of the tank and the rectangular junction of the insulation extensions is filled with a suitable loose insulation such as foamed plastic pellets or the like. The resiliency of the plastic pellets serves to keep the inner insulation panels tight against the underside of the plywood panels. The construction details of the inside corners such as 43 may also be readily appreciated by reference to FIGURE 26.

The installation of the metal sheathing and batten strips on flat surfaces is straight forward and has been described hereinbefore. The sheathing details at various corners of the tank may be had with reference to FIGURES 26, 27, 30 and 34. Thus, referring to FIGURE 27 and specifically to the corner designated by reference numeral 130, it is seen that at a two-plane junction, i.e. between the side and the bottom of the tank, the peripheral sheathing plates on the flat surfaces 102 are extended beyond the peripheral battens to within about 3 inches of the corner junctions of the second installation panels. This leaves a 3-inch edge of insulation exposed on each of the mating surfaces. These edges are covered by corner sheathing members 66 which are flat plates bent into an L-shaped configuration. In the preferred embodiment each leg of the L is about 6 inches wide. These L-shaped corner panels are secured to adjacent flat sheathing members by the use of battens and suitable sheet metal screws (not shown). While three L-shaped corners may be brought all the way up to and into a corner to close the corner, in an alternative embodiment such as illustrated in FIGURE 30, a separate three dimensional corner cap 103 (FIGURE 31) may also be used. In this embodiment corner cap 103 is positioned and then overlapped by the three L-shaped corner pieces 66 which are then fastened into corner cap 103 using batten strips and/or suitable wood screws not shown. The overlapping and construction details of the various metal sheathing strips to be used in an inside corner are illustrated schematically in FIGURE 34. Here again adjacent ones of said metal sheathing pieces are affixed using battens and/or suitable sheet metal screws, again not illustrated.

To inhibit convection currents between the warm exterior metal sheathing and the exterior of the outer tank wall, a plurality of vapor stops, 132, are provided as illustrated in FIGURES 28 and 29. These stops are of a height substantially equal to the thickness of the insulation layers wherein they are positioned. In the preferred embodiment they are placed between adjacent insulation panels and consist essentially of thin vapor impermeable metal sheets which are driven into place as each insulation layer is installed. These vapor stops effectively breakup any continuous passages between adjacent foam panels which passages could aid in the formation of undesirable convection currents which would decrease the effectiveness of the insulation system. In effect they cause the formation of a multiplicity of dead air passages which do not adversely affect the insulating characteristics of the overall structure.

FIGURE 32 shows in detail a section of a bottom portion of the insulated tank as it is supported in a preferred embodiment. It may be seen that the bottom 36 of the cargo container rests directly on a wooden support block 46 of which there exists a plurality. Block 46 may preferably be made so that grain is vertically oriented to provide maximum compressive load carrying capacity and may be composed of balsa wood for optimum thermal insulation efficiency. Block 46 is in turn supported by support rail 60 which, as indicated before, may be constructed of a material, e.g. 9% nickel steel, which retains its strength at cryogenic temperatures.

For the details of the construction of the insulation at the keys of the tank, reference should be had to FIGURE 33. As previously indicated, four vertical keyways serve to anchor the insulated cargo tank within the hold of the ship. Each of these keyways is defined by a pair of bracket-like members 54. As indicated in FIGURE 33, key bearing blocks 42 serve to position the key and hence the tank within their respective keyway. Key bearing blocks 42 are preferably made of wood, having a grain orientation which is perpendicular to the face of bracket member 54, and are of sufficient thickness and strength to withstand the dynamic loadings which may be imposed on them. Furthermore, they also insulate the bracket-like members 54 from the cold. The key bearing blocks 42 are positioned in the channel 64 present in each side of the metal key 62. Thus, any of the shear stresses imposed on the keys are taken by the walls of channels 64 and hence the insulation is not structurally relied on to withstand any of the stresses which are envisioned to arise in the key area.

It should be understood that the specific structures herein illustrated and described are intended to be representative only, as certain changes may obviously be made therein without departing from the clear teachings of the disclosure. For example, while the invention finds particular utility in conjunction with ship board cryogenic containers, those skilled in the art will readily appreciate that it may be employed to equal advantage for the construction of safe land-based storage facilities for cryogenic materials.

What is claimed is:

1. An insulation structure for a wall which comprises in combination:

A plurality of elongated fastening means affixed to said wall, and extending substantially perpendicular therefrom, a first layer of insulation mounted on said wall, a thermally law-conductive structural layer, said structural layer being secured in spaced relation to said wall by said fastening means and holding said first insulation layer against said wall, a second insulation layer covering the outermost ends of said fastening means, a metal sheathing layer affixed over said second insulation layer on the face thereof remote from said structural layer, and a second plurality of elongated means affixing said second insulation layer to said structural layer, said affixing means being positioned in laterally offset relationship from the axes of said elongated fastening means whereby a minimum of heat loss through said insulation structure results from said fastening and affixing means.

2. The structure of claim 1 wherein said first and said second insulation layers are each comprised of a plurality of insulating panels arrayed contiguously in end-to-end and side-to-side relationship and wherein said thermally non-conductive structural layer includes a plurality of plywood panels.

3. The structure of claim 2 wherein the material forming said insulating panels is selected from the group consisting of foamed polyvinyl chloride, polystyrene and polyurethane.

4. The combination of claim 3 wherein the joints between the panels comprising the first and second insulation layers and the intermediate support layer are all staggered so as to eliminate any joints extending straight through all the layers.

5. The combination of claim 4 wherein a plurality of vapor stops are placed between adjacent ones of said panels comprising said first insulation layer and a second plurality of vapor stops are placed between adjacent ones of said panels comprising said second insulation layer.

6. In combination a tanker having a cargo hold of predetermined shape and an insulated container for liquefied gases maintained at atmospheric pressure and cryogenic temperature mounted within said hold, said insulated container including:
(a) a cargo tank having an inner wall and an outer wall;
(b) a plurality of fastening means affixed to the exterior of said outer wall;
(c) a first layer of insulation positioned on the exterior of said outer wall;
(d) an intermediate thermally law-conductive support wall, said intermediate support wall holding said first layer of insulation against the exterior of said outer wall and being secured to said outer wall by said fastening means; and
(e) a second insulation layer affixed to said intermediate support wall.

7. The combination of claim 6 further including cooperative key and keyway means between the exterior of said container and the interior of said cargo hold to permit relative movement therebetween due to thermally and dynamically induced changes in the position of said container.

8. The combination of claim 6 wherein said first and second insulation layers are each comprised of a plurality of insulating panels arrayed contiguously in end-to-end and side-to-side relationship and wherein said intermediate support wall includes a plurality of plywood panels.

9. The combination of claim 8 further characterized in that the material of said insulating panels is selected from the group consisting of foamed polyvinyl chloride, polystyrene and polyurethane.

10. In combination a tanker having a cargo hold of predetermined shape and an insulated container for liquefied gases maintained at atmospheric pressure and cryogenic temperature mounted within said hold, said insulated container including:
(a) a cargo tank having an outer wall;
(b) a plurality of fastening means affixed to the exterior of said outer wall;
(c) a first layer of insulation positioned on the exterior of said outer wall;
(d) an intermediate thermally low-conductive support wall, said intermediate support wall holding said first layer of insulation against the exterior of said outer wall and being supported by and secured to said outer wall by said fastening means; and
(e) a second insulation layer affixed to said intermediate support wall.

References Cited

UNITED STATES PATENTS

| | | | |
|---|---|---|---|
| 1,251,830 | 1/1918 | Siegfried | 220—9 |
| 3,112,043 | 11/1963 | Tucker | 220—10 |
| 3,158,459 | 11/1964 | Guilhem | 220—15 X |
| 3,224,624 | 12/1965 | French | 220—15 |
| 3,261,087 | 7/1966 | Schlumberger | 220—9 X |
| 3,305,122 | 2/1967 | Pringle | 220—15 |
| 3,319,431 | 5/1967 | Clarke et al. | 220—9 X |
| 3,339,783 | 9/1967 | Gorman | 220—15 |
| 3,367,492 | 2/1968 | Pratt et al. | 220—15 X |
| 3,392,866 | 7/1968 | Alleaume | 220—15 |

JOSEPH R. LECLAIR, Primary Examiner

JAMES R. GARRETT, Assistant Examiner

U.S. Cl. X.R.

114—74; 220—83